United States Patent
Margaryan et al.

(10) Patent No.: US 11,465,932 B2
(45) Date of Patent: Oct. 11, 2022

(54) ALKALI FREE FLUOROPHOSPHATE BASED GLASS SYSTEMS

(71) Applicant: AFO RESEARCH, INC., Glendale, CA (US)

(72) Inventors: Ashot A. Margaryan, Glendale, CA (US); Alfred A. Margaryan, Glendale, CA (US)

(*) Notice: Subject to any disclaimer, the term of this patent is extended or adjusted under 35 U.S.C. 154(b) by 389 days.

(21) Appl. No.: 16/827,675

(22) Filed: Mar. 23, 2020

(65) Prior Publication Data

US 2020/0308044 A1   Oct. 1, 2020

Related U.S. Application Data

(60) Provisional application No. 62/823,523, filed on Mar. 25, 2019.

(51) Int. Cl.
| | | |
|---|---|---|
| C03C 3/247 | (2006.01) | |
| G01T 1/02 | (2006.01) | |
| G01T 1/06 | (2006.01) | |
| C03C 4/12 | (2006.01) | |

(52) U.S. Cl.
CPC ............ C03C 3/247 (2013.01); C03C 4/12 (2013.01); G01T 1/023 (2013.01); G01T 1/06 (2013.01)

(58) Field of Classification Search
CPC .................................. C03C 3/247; C03C 4/12
USPC ........................................................ 501/44
See application file for complete search history.

(56) References Cited

U.S. PATENT DOCUMENTS

| | | |
|---|---|---|
| 4,358,543 A | 11/1982 | Nozawa |
| 5,480,845 A | 1/1996 | Maze et al. |
| 7,608,551 B2 | 10/2009 | Margaryan et al. |
| 7,637,124 B2 | 12/2009 | Margaryan et al. |
| 7,989,376 B2 | 8/2011 | Margaryan et al. |
| 8,356,493 B2 | 1/2013 | Margaryan et al. |
| 8,361,914 B2 | 1/2013 | Margaryan et al. |
| 9,761,828 B2 | 9/2017 | Dabich, II et al. |
| 10,393,887 B2 | 8/2019 | Margaryan et al. |
| 2010/0327186 A1 | 12/2010 | Margaryan et al. |
| 2017/0016995 A1 | 1/2017 | Margaryan et al. |
| 2019/0106352 A1* | 4/2019 | Nojima .................. C03C 3/097 |
| 2020/0131076 A1* | 4/2020 | Iwasaki .................. C03C 3/062 |
| 2021/0387899 A1* | 12/2021 | Fevre ..................... C03C 3/087 |

FOREIGN PATENT DOCUMENTS

| | | |
|---|---|---|
| JP | 2012-506838 | 3/2012 |
| JP | 2014-029314 | 2/2014 |
| WO | WO2010051393 | 5/2010 |

OTHER PUBLICATIONS

PCT/US2020/24347 ; ISR and Writtn Opinion; dated Jun. 16, 2020, And All Citations Therein.
EPO Office Action dated Apr. 6, 2020; App No. 16828342.2; And All Citations Therein.
Database WPI Week 197824 Aug. 5, 1977 Thomson Scientific, London, GB; AN 1978-43679A XP002789499,—& SU 576 692 A Urosovskaya L N Aug. 5, 1977.
Jiang J et al: "Cerium-Containing Glasses for Fast Scintillators", Jouranl of Alloys and Compou, Elsevier Sequoia, Lausanne, CH, vol. 275-277, Jul. 24, 1998, pp. 733-737, XP004183991, ISSN: 0925-8388, DOI: 10.1016/SO925-8388(98)00431-9.
Database WPI Week 199604 May 27, 1995 Thomoson Scientific, London, GB; AN 1996-038567 XP002789500—& RU2036173 C1 Lengd Lensovet Techn Inst May 27, 1995.
Weihong Lei et al: "Optical Evaluation on Nd3+ Doped Phosphate Glasses for O-Band Amplification", Applied Optics, Optical Society of America, Washington, DC, US vol. 50 No. 6, Feb. 20, 2011, pp. 835 to 841, XP001560498, ISSN: 0003-6935, DOI: 10.1364/AO.50.000835.
JP 2020-125436 Office Action dated Jul. 16, 2021.

* cited by examiner

*Primary Examiner* — Christopher M Raabe
(74) *Attorney, Agent, or Firm* — Patent Law Agency, LLC; Peter Ganjian

(57) ABSTRACT

Alkali free fluorophosphate-based glass system that is highly radiation resistance (for example, they remain transparent and do not solarize before, during, and after application of high energy radiation of $10^5$ Rad or (1 kGy) or greater) and hence, reusable and further, when used with Ce provide a mechanism for determining the existence of radiation.

4 Claims, No Drawings

ALKALI FREE FLUOROPHOSPHATE BASED GLASS SYSTEMS

CROSS-REFERENCE TO RELATED APPLICATIONS

This application claims the benefit of priority of co-pending U.S. Utility Provisional Patent Application 62/823,523, filed 25 Mar. 2019, the entire disclosure of which is expressly incorporated by reference in its entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relate to radiation resistant alkali free fluorophosphate based glass system and, more particularly to radiation resistant alkali free fluorophosphate based glass system that include Oxides and Fluorides of Sb and or Zn and or combinations thereof.

Description of Related Art

Conventional alkali free fluorophosphate-based glass systems are well known and have been in use for a number of years. Regrettably, existing conventional alkali free fluorophosphate-based glass systems that are radiation resistance and that do provide a mechanism for determining existence of radiation via scintillations of Ce compounds are only 65% transparent in ultra-violet spectrum under $10^5$ Rads of radiation (or 1 kGy) or higher.

Further, scintillations generated by existing conventional alkali free fluorophosphate-based glass systems have an unwanted long decay time $\tau$ of about 20 ns to 40 ns within the ultra-violet spectrum under $10^5$ Rads of radiation (or 1 kGy) or higher. Additionally, existing conventional alkali free fluorophosphate-based glass systems that do use $CeO_2$ for scintillations exhibit unwanted afterglow during scintillation processes, compounding issues with long decay times.

Non-limiting, non-exhaustive listing of examples of conventional alkali free fluorophosphate-based glass systems are disclosed in U.S. Pat. No. 7,608,551 to Margaryan et al., U.S. Pat. No. 7,637,124 to Margaryan et al., U.S. Pat. No. 7,989,376 to Margaryan, U.S. Pat. No. 8,356,493 to Margaryan, U.S. Pat. No. 8,361,914 to Margaryan et al., U.S. Patent Application Publication 2010/0327186 to Margaryan et al., and U.S. Pat. No. 10,393,887 to Margaryan et al., the entire disclosures of all of which documents are expressly incorporated by reference in their entirety herein.

Accordingly, in light of the current state of the art and the drawbacks to current glass systems and methods of making thereof mentioned above, a need exists for a glass system that would be radiation resistant and that would remain transparent under applications of high energy radiations (e.g., $10^5$ Rads of radiation (or 1 kGy) or higher) throughout most of the electromagnetic radiation spectra before, during, and after high energy radiations. Further, a need exists for a glass system that would also scintillate within the transmittance range of the glass system before, during, and after high energy radiations. Furthermore, a need exists for a glass system that would have shorten decay time of scintillations before, during, and after high energy radiations. Additionally, a need exists for a glass system that would have no afterglow during scintillations before, during, and after high energy radiations.

BRIEF SUMMARY OF THE INVENTION

A non-limiting, exemplary aspect of an embodiment of the present invention provides an alkali free fluorophosphate based glass system, comprising of:
a glass base composition, having:
barium metaphosphate $Ba(PO_3)_2$, in mol percent;
aluminum metaphosphate $Al(PO_3)_3$ in mol percent, and
one or more fluorides;
where the one or more fluorides are selected from a group consisting of:
barium fluoride $BaF_2$ and $RFx$ in mol percent;
where R is selected from a group consisting of: Mg, Ca, Sr, Pb, Y, Bi, Al, Zn, and combinations thereof, and subscript x is an index representing an amount of fluorine (F) in the compound $RF_x$;
one or more dopant in wt % over 100 wt % of the glass base composition;
where the one or more dopant is selected from a group consisting of: $SbF_3$, $Sb_2O_3$, or combinations thereof; and
one or more co-dopants in wt % over 100 wt % of the glass base composition selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, $ZnO$, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, $CuO$, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

A non-limiting, exemplary aspect of an embodiment of the present invention provides an alkali free fluorophosphate based glass system, comprising of:
a glass base composition, having:
barium metaphosphate $Ba(PO_3)_2$, in mol percent,
aluminum metaphosphate $Al(PO_3)_3$ in mol percent, and
one or more antimony (Sb);
where the one or more antimony is selected from a group consisting of: $Sb_2O_3$, SbF3 in mol percent; and
one or more fluorides;
where the one or more fluorides are selected from a group consisting of:
barium fluoride $BaF_2$ and $RFx$ in mol percent;
where R is selected from a group consisting of: Mg, Ca, Sr, Pb, Y, Bi, Al, Zn, and combinations thereof, and subscript x is an index representing an amount of fluorine (F) in the compound $RF_x$; and
one or more dopants in wt % over 100 wt % of the glass base composition selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, $ZnO$, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, $CuO$, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

A non-limiting, exemplary aspect of an embodiment of the present invention provides an alkali free fluorophosphate based glass system, comprising of:
a glass base composition, having:
barium metaphosphate $Ba(PO_3)_2$, in mol percent;

aluminum metaphosphate $Al(PO_3)_3$ in mol percent, and one or more fluorides;
where the one or more fluorides are selected from a group consisting of:
barium fluoride $BaF_2$ in mol percent;
Magnesium Fluoride $MgF_2$ in mol %; and
$RF_x$ in mol percent;
where R is selected from a group consisting of: Ca, Sr, Pb, Y, Bi, Al, Zn, and combinations thereof, and subscript x is an index representing an amount of fluorine (F) in the compound $RF_x$; and
one or more dopants in wt % over 100 wt % of the glass base composition;
where the one or more dopants are selected from a group consisting of: $SbF_3$, $Sb_2O_3$, and combinations thereof; and
one or more co-dopants in wt % over 100 wt % of the glass base composition selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

A non-limiting, exemplary aspect of an embodiment of the present invention provides an alkali free fluorophosphate based glass system, comprising of:
a glass base composition, having:
barium metaphosphate $Ba(PO_3)_2$, in mol percent;
aluminum metaphosphate $Al(PO_3)_3$ in mol percent,
one or more antimony (Sb),
where the one or more antimony is selected from a group consisting of: $Sb_2O_3$, $SbF_3$, and combinations thereof in mol percent; and
and
one or more fluorides;
where the one or more fluorides are selected from a group consisting of:
barium fluoride $BaF_2$ in mol percent;
Magnesium Fluoride $MgF_2$ in mol %; and
$RF_x$ in mol percent;
where R is selected from a group consisting of: Ca, Sr, Pb, Y, Bi, Al, Zn, and combinations thereof, and subscript x is an index representing an amount of fluorine (F) in the compound $RF_x$; and
one or more dopants in wt % over 100 wt % of the glass base composition;
where the one or more dopants are selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

None

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

For the sake of convenience and clarity, this disclosure uses the word "energy" in terms of both wave energy, particle energy, and mixtures thereof. Further, this disclosure defines radiation in accordance with its ordinary meaning, which is the emission of energy as electromagnetic waves or as moving subatomic particles, or mixtures thereof that may cause ionization. In addition, this disclosure defines high particle energy in terms of average neutron fluxes of at least $3 \times 10^9$ n/cm$^2$ see, and average neutron fluencies of at least $2 \times 10^{16}$ n/cm$^2$.

Further, high energy may include mixed beam and particle (protons, pions, electrons, neutrons, and gamma ray) about 1 kGy or higher. Accordingly, this invention defines the collective phrases "high energy," "high radiation," "high radiation energy," "high energy environment," "heavily irradiated environment," "high frequency electromagnetic radiation," and so on as energy or radiation defined by the above high wave energy and or high particle energy parameters.

In addition, throughout the disclosure, the words "solarize" and its derivatives such as "solarization," "solarized," and so on define the darkening, browning, and or burning up of materials due to irradiation (i.e., exposure to various amounts of applied energy (e.g., high energy)). The words "desolarize" and its derivatives such as "desolarization," "desolarized," and so on define the ability of a material to continuously resist (or reverse) the solarization process while exposed to high energy.

The phrase "desolarizer" may be defined as agent(s) that reverse(s) the act of solarization (e.g., reverse the act of burning up or browning of the glass systems (e.g., optical component)) when in heavily irradiated environment. Further, in addition to its ordinary meaning, transparency or derivatives thereof (e.g., transparent, transmittance, etc.) may further be defined by the amount of passage of radiation energy (electromagnetic, particle, or mixtures thereof) through a glass system without distortion. Additionally, transmittance is defined as the ratio of the light energy falling on a body to that transmitted through it.

One or more embodiments of the present invention provide alkali free fluorophosphate-based glass systems that are highly radiation resistance (for example, they remain transparent and do not solarize before, during, and after application of high energy radiation of $10^5$ Rad or (1 kGy) or greater) and hence, are reusable and further, when used with Ce provide a mechanism for determining the existence of radiation.

The alkali free fluorophosphate-based glass systems of the present invention provide a mechanism for determining the existence of high-energy radiation commensurate with duration of irradiation and may be reused. In other words, one or more embodiments of the present invention provide glass systems that also scintillate within the transmittance range of the glass systems before, during, and after high energy radiations.

The alkali free fluorophosphate-based glass systems of the present invention have improved radiation resistance and radiation shielding against high energy radiation (for example, $10^5$ Rad or (1 kGy) or greater) while they scintillate within the ultra-violet spectrum to provide a mechanism for determining the existence of high energy radiation. One or more embodiments of the alkali free fluorophosphate-based glass systems of the present invention scintillate within the ultra-violet spectrum when in high energy radiation environment while resisting and shielding against high energy radiation.

As detailed below, one or more embodiments of the present invention use dopants and or co-dopants that scintillate within the ultra-violet spectrum and hence, provide a mechanism for indication of existence of high energy radiation. In other words, the reusable, highly radiation resistant glass systems of the present invention include one or more sensor element (e.g., Cerium—Ce) that scintillates within the ultra-violate spectrum under application of high energy radiation of $10^5$ Rad or (1 kGy) or greater.

As importantly, one or more embodiments of the present invention provide glass systems that have shorten decay times of scintillations before, during, and after high energy radiations. Additionally, one or more embodiments of the present invention provide glass systems that have no afterglow when scintillating before, during, and after high energy radiations.

GLASS SYSTEM EXAMPLES

In particular, one or more embodiments of the present invention provide a glass system that may be comprised of alkali free fluorophosphate-based glass system that may include:

{{Glass Base Composition} and {Dopant} and or {Co-Dopant}}

Glass System—Example (1)

{{$Ba(PO_3)_2$, $Al(PO_3)_3$, $BaF_2$, and $RF_x$} and {Sb Dopant} and or {Co-Dopant}} (1)

The above glass system example 1 is an alkali free fluorophosphate based glass formed from a composition, comprising of:

a glass base composition, having:
barium metaphosphate $Ba(PO_3)_2$, in mol percent;
aluminum metaphosphate $Al(PO_3)_3$ in mol percent, and fluorides;
where one or more fluorides are selected from a group consisting of:
barium fluoride $BaF_2$ and $RF_x$ in mol percent;
where R is selected from a group consisting of: Mg, Ca, Sr, Pb, Y, Bi, Al, Zn, and combinations thereof and subscript x is an index representing an amount of fluorine (F) in the compound $RF_x$; and
one or more dopants in wt % over 100 wt % of the glass base composition;
where the one or more dopants are selected from a group consisting of: $SbF_3$, $Sb_2O_3$, and combinations thereof; and one or more co-dopants in wt % over 100 wt % of the glass base composition selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, $ZnO$, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, $CuO$, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

Non-Limiting Sampling of Glass System Example 1

TABLE 1

| Glass Base Composition of Glass System example (1) (mol %) | | | | Dopants wt (%) | co-dopants wt (%) |
|---|---|---|---|---|---|
| $Ba(PO_3)_2$ | $Al(PO_3)_3$ | $BaF_2$ | $RF_x$ | Over 100% | Over 100% |
| 20 | 20 | 30 | 30 | 0.5 | 0.5 |
| 15 | 15 | 35 | 35 | 0.5 | 1.0 |
| 10 | 10 | 40 | 40 | 1.0 | 1.5 |
| 20 | 10 | 35 | 35 | 1.5 | 2.0 |
| 10 | 20 | 20 | 50 | 2.0 | 3.0 |
| 5 | 10 | 50 | 35 | 2.0 | 5.0 |

R is selected from a group consisting of: Mg, Ca, Sr, Pb, Y, Bi, Al, Zn, and combinations thereof;

Sub-script x is an index representing an appropriate amount of fluorine (F) in the compound $RF_x$ (e.g., $MgF_2$, $CaF_2$, $SrF_2$, $PbF_2$, $YF_3$, $BiF_3$, $AlF_3$, $ZnF_2$)

one or more dopant/co-dopant are over 100 weight (wt) % of the base composition of glass system example (1)

one or more dopants are selected from a group consisting of: $SbF_3$, $Sb_2O_3$, and combinations thereof one or more co-dopants are selected from a group consisting of oxides and or fluorides of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, $ZnO$, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, $CuO$, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

Non-Limiting Particular Sampling of Glass System Example 1

The following is a non-limiting, specific sampling of glass system example 1, that includes an alkali free fluorophosphate based glass formed from a composition, comprising of:

a metaphosphate, $Ba(PO_3)_2$, from 10 to 45 mol percent;
a metaphosphate, $Al(PO_3)_3$, from 5 to 30 mol percent;
fluorides;
where one or more of the fluorides are selected from a group consisting of:
barium fluoride $BaF_2$ and RFx from 30 to 90 mol percent;
where R is selected from a group consisting of: Mg, Ca, Sr, Pb, Y, Bi, Al, Zn, and combinations thereof, and subscript x is an index representing an amount of fluorine (F) in the compound $RF_x$; and
a dopant $Sb_2O_3$ from 0.1 to 20 wt % over 100% of base composition; and
one or more co-dopant, from 0.1 to 25 wt % over 100% of base composition, selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, $ZnO$, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, $CuO$, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

Non-Limiting Specific Sampling of Glass System Example 1

The following is a non-limiting, specific sampling of glass system example 1, that includes an alkali free fluorophosphate based glass formed from a composition, comprising of:
- a metaphosphate, $Ba(PO_3)_2$, from 10 to 45 mol percent;
- a metaphosphate, $Al(PO_3)_3$, from 5 to 30 mol percent;
- fluorides;
- where the fluorides are selected from a group consisting of:
- barium fluoride $BaF_2$ and $ZnF_2$ from 30 to 90 mol percent;
- $Sb_2O_3$ as dopant, from 0.1 to 20 wt % over 100% of base composition; and
- $CeF_3$ as co-dopant, from 0.1 to 25 wt % over 100% of base composition.

Glass System—Example (2)

$$\{\{Ba(PO_3)_2, Al(PO_3)_3, BaF_2, Sb_2O_3, \text{ and } RF_x\} \text{ and } \{\text{Dopants}\} \text{ and or } \{\text{Co-Dopants}\}\} \quad (2)$$

The above glass system example 2 is an alkali free fluorophosphate based glass formed from a composition, comprising of:
- a glass base composition, having:
- barium metaphosphate $Ba(PO_3)_2$, in mol percent,
- aluminum metaphosphate $Al(PO_3)_3$ in mol percent,
- antimony Oxide ($Sb_2O_3$) in mol percent; and
- fluorides;
- where one or more fluorides are selected from a group consisting of:
- barium fluoride $BaF_2$ and $RFx$ in mol percent;
- where R is selected from a group consisting of: Mg, Ca, Sr, Pb, Y, Bi, Al, Zn, and combinations thereof and subscript x is an index representing an amount of fluorine (F) in the compound $RF_x$; and
- one or more dopants and or co-dopants in wt % over 100 wt % of the glass base composition selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

R is selected from a group consisting of: Mg, Ca, Sr, Pb, Y, Bi, Al, Zn and combinations thereof;

Sub-script x is an index representing an appropriate amount of fluorine (F) in the compound $RF_x$ (e.g., $MgF_2$, $CaF_2$, $SrF_2$, $PbF_2$, $YF_3$, $BiF_3$, $AlF_3$, $ZnF_2$)

one or more dopant/co-dopant are over 100 weight (wt) % of the base composition of glass system example (2)

one or more dopant/co-dopant are selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

Non-Limiting Particular Sampling of Glass System Example 2

The following is a non-limiting, specific sampling of glass system example 2, that includes an alkali free fluorophosphate based glass formed from a composition, comprising of:
- a metaphosphate, $Ba(PO_3)_2$, from 10 to 45 mol percent;
- a metaphosphate, $Al(PO_3)_3$, from 5 to 30 mol percent;
- antimony Oxide ($Sb_2O_3$) in 0.1 to 20 mol percent; and
- fluorides;
- where one or more fluorides are selected from a group consisting of:
- barium fluoride $BaF_2$ 10 to 60 mol %; and
- $RFx$ from 5 to 70 mol percent;
- where R is selected from a group consisting of: Mg, Ca, Sr, Pb, Y, Bi, Al, Zn, and combinations thereof, and subscript x is an index representing an amount of fluorine (F) in the compound $RF_x$; and
- one or more dopants/co-dopant, from 0.1 to 25 wt % over 100% of base composition, selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

Non-Limiting Specific Sampling of Glass System Example 2

The following is a non-limiting, specific sampling of glass system example 2, that includes an alkali free fluorophosphate based glass formed from a composition, comprising of:

Non-Limiting Sampling of Glass System Example (2)

TABLE 2

| Glass Base Composition of Glass System Example (2) (mol %) | | | | | Dopants wt (%) | co-dopants wt (%) |
| --- | --- | --- | --- | --- | --- | --- |
| $Ba(PO_3)2$ | $Al(PO_3)_3$ | $Sb_2O_3$ | $BaF_2$ | $RF_x$ | Over 100% | Over 100% |
| 20 | 10 | 5 | 35 | 30 | .1 | 5 |
| 10 | 5 | 5 | 45 | 35 | 1 | 4 |
| 20 | 10 | 1 | 35 | 35 | 2 | 2 |
| 20 | 10 | .5 | 34.5 | 35 | .5 | 3 |
| 10 | 5 | 1 | 49 | 35 | .1 | 1 |
| 10 | 5 | .5 | 50 | 34.5 | .8 | 4 | a metaphosphate, $Ba(PO_3)_2$, from 10 to 45 mol percent;
a metaphosphate, $Al(PO_3)_3$, from 5 to 30 mol percent;
antimony Oxide $(Sb_2O_3)$ in 0.1 to 20 mol percent; and
fluorides;
where one or more fluorides are selected from a group consisting of:
   barium fluoride $BaF_2$ from 30 to 90 mol percent;
   Zinc Fluoride $ZnF_2$ from 5 to 70 mol percent;
   $CeF_3$ as dopant, from 0.1 to 25 wt % over 100% of base composition.

Glass System Example (3)

$\{\{Ba(PO_3)_2, Al(PO_3)_3, BaF_2, SbF_3, \text{ and } RF_x\}$ and $\{Dopants\}$ and or $\{Co\text{-}Dopants\}\}$ (3)

The above glass system example 3 is an alkali free fluorophosphate based glass formed from a composition, comprising of:
a glass base composition, having:
   barium metaphosphate $Ba(PO_3)_2$, in mol percent,
   aluminum metaphosphate $Al(PO_3)_3$ in mol percent,
   fluorides;
where one or more fluorides are selected from a group consisting of:
   antimony fluoride $(SbF_3)$ in mol percent;
   barium fluoride $BaF_2$ in mol percent; and
   $RF_x$ in mol percent;
where R is selected from a group consisting of: Mg, Ca, Sr, Pb, Y, Bi, Al, Zn, and combinations thereof, and subscript x is an index representing an amount of fluorine (F) in the compound $RF_x$; and
one or more dopants and or co-dopants in wt % over 100 wt % of the glass base composition selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

Non-Limiting Sampling of Glass System Example (3)

TABLE 3

| Glass Base Composition of Glass System Example (3) (mol %) | | | | | Dopants wt (%) | co-dopants wt (%) |
| --- | --- | --- | --- | --- | --- | --- |
| $Ba(PO_3)_2$ | $Al(PO_3)_3$ | $SbF_3$ | $BaF_2$ | $RF_x$ | Over 100% | Over 100% |
| 5 | 5 | .1 | 49.9 | 40 | .1 | 1.5 |
| 15 | 10 | .5 | 30.5 | 44 | 2 | .5 |
| 25 | 5 | 2 | 40 | 28 | .5 | 1 |
| 30 | 5 | 1 | 30 | 34 | 2 | 5 |
| 35 | 5 | 1.5 | 50 | 8.5 | .1 | 1 |
| 45 | 5 | 1 | 40 | 9 | .5 | 1.2 |

R is selected from a group consisting of: Mg, Ca, Sr, Pb, Y, Bi, Al, Zn, and combinations thereof;
Sub-script x is an index representing an appropriate amount of fluorine (F) in the compound $RF_x$ (e.g., $MgF_2$, $CaF_2$, $SrF_2$, $PbF_2$, $YF_3$, $BiF_3$, $AlF_3$, $ZnF_2$)
one or more dopant/co-dopant are over 100 weight (wt) % of the base composition of glass system example (3)
one or more dopant/co-dopant are selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

Non-Limiting Particular Sampling of Glass System Example 3

The following is a non-limiting, specific example of glass system 3, that includes an alkali free fluorophosphate based glass formed from a composition, comprising of:
   a metaphosphate, $Ba(PO_3)_2$, from 10 to 40 mol percent;
   a metaphosphate, $Al(PO_3)_3$, from 5 to 10 mol percent;
   fluorides;
where one or more fluorides are selected from a group consisting of:
   antimony fluoride $(SbF_3)$ from 0.1 to 1 in mol percent;
   barium fluoride $BaF_2$ 10 to 35 mol O/%; and
   RFx from 5 to 15 mol percent;
where R is selected from a group consisting of: Mg, Ca, Sr, Pb, Y, Bi, Al, Zn, and combinations thereof, and subscript x is an index representing an amount of fluorine (F) in the compound $RF_x$; and
one or more dopants/co-dopant, from 0.1 to 25 wt % over 100% of base composition, selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

Non-Limiting Specific Sampling of Glass System Example 3

The following is a non-limiting, specific example of glass system 3, that includes an alkali free fluorophosphate based glass formed from a composition, comprising of:
   a metaphosphate, $Ba(PO_3)_2$, from 10 to 20 mol percent;
   a metaphosphate, $Al(PO_3)_3$, from 5 to 10 mol percent;
   fluorides;
where one or more fluorides are selected from a group consisting of:
   antimony fluoride $(SbF_3)$ from 0.5 to 5 in mol percent;
   barium fluoride $BaF_2$ 30 to 50 mol %; and
   Zinc Fluoride $ZnF_2$ from 0.1 to 10 mol percent;
   $CeF_3$ as dopant, from 0.1 to 15 wt % over 100% of base composition.

Glass System Example (4)

{{Ba(PO$_3$)$_2$, Al(PO$_3$)$_3$, BaF$_2$, Sb$_2$O$_3$, and RF$_x$} and {Sb$_2$O$_3$ Dopant} and or {Co-Dopant}} (4)

The above glass system example 4 is an alkali free fluorophosphate based glass formed from a composition, comprising of:
a glass base composition, having:
barium metaphosphate Ba(PO$_3$)$_2$, in mol percent,
aluminum metaphosphate Al(PO$_3$)$_3$ in mol percent,
antimony oxide (Sb$_2$O$_3$) in mol percent;
fluorides;
where one or more fluorides are selected from a group consisting of:
barium fluoride BaF$_2$ in mol percent; and
RFx in mol percent;
where R is selected from a group consisting of: Mg, Ca, Sr, Pb, Y, Bi, Al, Zn, and combinations thereof, and subscript x is an index representing an amount of fluorine (F) in the compound RF$_x$; and
one or more dopants in wt % over 100 wt % of the glass base composition;
where the dopant is Sb$_2$O$_3$; and
one or more co-dopants in wt % over 100 wt % of the glass base composition selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, T$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Sampling of Glass System Example (4)

TABLE 4

| Glass Base Composition of Glass System Example (4) (mol %) | | | | | Dopants wt (%) Over 100% | co-dopants wt (%) |
| --- | --- | --- | --- | --- | --- | --- |
| Ba(PO$_3$)$_2$ | Al(PO$_3$)$_3$ | Sb$_2$O$_3$ | BaF$_2$ | RF$_x$ | (Sb$_2$O$_3$) | Over 100% |
| 15 | 5 | 5 | 40 | 35 | .1 | 2 |
| 25 | 10 | 2 | 50 | 13 | .1 | 1.5 |
| 45 | 5 | 2 | 30 | 18 | .1 | .5 |
| 35 | 5 | 5 | 40 | 15 | .5 | .5 |
| 55 | 5 | 1 | 20 | 19 | .1 | 1 |
| 50 | 5 | 3 | 40 | 12 | .2 | 1 |

R is selected from a group consisting of: Mg, Ca, Sr, Pb, Y, Bi, Al, Zn, and combinations thereof;
Sub-script x is an index representing an appropriate amount of fluorine (F) in the compound RF$_x$ (e.g., MgF$_2$, CaF$_2$, SrF$_2$, PbF$_2$, YF$_3$, BiF$_3$, AlF$_3$, ZnF$_2$)
one or more dopant/co-dopant are over 100 weight (wt) 0% of the base composition of glass system example (4)
one or more dopants in wt % over 100 wt % of the glass base composition;
where the dopant is Sb$_2$O$_3$; and
one or more co-dopants in wt % over 100 wt % of the glass base composition selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Particular Sampling of Glass System Example 4

The following is a non-limiting, specific sampling of glass system example 4, that includes an alkali free fluorophosphate based glass formed from a composition, comprising of:
a metaphosphate, Ba(PO$_3$)$_2$, from 10 to 40 mol percent;
a metaphosphate, Al(PO$_3$)$_3$, from 5 to 10 mol percent
antimony oxide (Sb$_2$O$_3$) from 0.1 to 5 mol percent;
fluorides;
where one or more fluorides are selected from a group consisting of:
barium fluoride BaF$_2$ 20 to 50 mol %; and
RFx from 0.1 to 10 mol percent;
where R is selected from a group consisting of: Mg, Ca, Sr, Pb, Y, Bi, Al, Zn, and combinations thereof, and subscript x is an index representing an amount of fluorine (F) in the compound RF$_x$; and
one or more dopants in wt % over 100 wt % of the glass base composition;
where the dopant is Sb$_2$O$_3$ from 0.1 wt % to 5 wt %; and
one or more co-dopants from 0.1 wt % to 10 wt % over 100 wt % of the glass base composition selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Specific Sampling of Glass System Example 4

The following is a non-limiting, specific sampling of glass system example 4, that includes an alkali free fluorophosphate based glass formed from a composition, comprising of:
a metaphosphate, Ba(PO$_3$)$_2$, from 5 to 50 mol percent;
a metaphosphate, Al(PO$_3$)$_3$, from 5 to 15 mol percent;
antimony oxide (Sb$_2$O$_3$) from 0.1 to 5 mol percent;
fluorides;
where one or more fluorides are selected from a group consisting of:
barium fluoride BaF$_2$ 10 to 55 mol %; and
Zinc Fluoride ZnF$_2$ from 0.1 to 20 mol percent;
Sb$_2$O$_3$ as dopant from 0.1 wt % to 5 wt % over 100% of base composition;

CeF$_3$ as co-dopant, from 0.1 to 15 wt % over 100% of base composition.

Glass System Example (5)

$\{\{Ba(PO_3)_2, Al(PO_3)_3, BaF_2, SbF_3, \text{ and } RF_x\}$ and $\{SbF_3 \text{ Dopant}\}$ and or $\{Co\text{-}Dopant\}\}$ (5)

The above glass system example 5 is an alkali free fluorophosphate based glass formed from a composition, comprising of:
a glass base composition, having:
barium metaphosphate Ba(PO$_3$)$_2$, in mol percent,
aluminum metaphosphate Al(PO$_3$)$_3$ in mol percent,
fluorides;
where one or more fluorides are selected from a group consisting of:
barium fluoride BaF$_2$ in mol percent;
antimony fluoride SbF$_3$ in mol percent
RFx in mol percent;
where R is selected from a group consisting of: Mg, Ca, Sr, Pb, Y, Bi, Al, Zn, and combinations thereof, and subscript x is an index representing an amount of fluorine (F) in the compound RF$_x$; and
one or more dopants in wt % over 100 wt % of the glass base composition;
where the dopant is SbF$_3$; and
one or more co-dopants in wt % over 100 wt % of the glass base composition selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Sampling of Glass System Example (5)

TABLE 5

| Glass Base Composition of Glass System Example (5) (mol %) | | | | | Dopants wt (%) Over 100% | co-dopants wt (%) |
| --- | --- | --- | --- | --- | --- | --- |
| Ba(PO$_3$)$_2$ | Al(PO$_3$)$_3$ | BaF$_2$ | SbF$_3$ | RF$_x$ | (SbF$_3$) | Over 100% |
| 10 | 10 | 50 | 1 | 29 | .1 | 15 |
| 25 | 10 | 45 | .5 | 19.5 | .2 | 2 |
| 38 | 5 | 30 | 2 | 25 | .5 | 1.5 |
| 20 | 10 | 50 | 1 | 19 | .1 | .5 |
| 10 | 5 | 25 | .1 | 59.9 | .1 | 1.2 |
| 10 | 5 | 50 | 5 | 30 | .1 | 5 |

R is selected from a group consisting of: Mg, Ca, Sr, Pb, Y, Bi, Al, Zn, and combinations thereof;
Sub-script x is an index representing an appropriate amount of fluorine (F) in the compound RF$_x$ (e.g., MgF$_2$, CaF$_2$, SrF$_2$, PbF$_2$, YF$_3$, BiF$_3$, AlF$_3$, ZnF$_2$)
one or more dopant/co-dopant are over 100 weight (wt) % of the base composition of glass system example (5)
one or more dopants in wt % over 100 wt % of the glass base composition;
where the dopant is SbF$_3$; and
one or more co-dopants in wt % over 100 wt % of the glass base composition selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Particular Sampling of Glass System Example 5

The following is a non-limiting, specific sampling of glass system example 5, that includes an alkali free fluorophosphate based glass formed from a composition, comprising of:
a metaphosphate, Ba(PO$_3$)$_2$, from 10 to 40 mol percent;
a metaphosphate, Al(PO$_3$)$_3$, from 5 to 20 mol percent;
fluorides;
where one or more fluorides are selected from a group consisting of:
barium fluoride BaF$_2$ 10 to 50 mol %;
antimony fluoride SbF$_3$ 0.1 to 10 mol %; and
RFx from 0.1 to 20 mol percent;
where R is selected from a group consisting of: Mg, Ca, Sr, Pb, Y, Bi, Al, Zn, and combinations thereof, and subscript x is an index representing an amount of fluorine (F) in the compound RF$_x$; and
one or more dopants in wt % over 100 wt % of the glass base composition;
where the dopant is SbF$_3$ from 0.1 wt % to 2 wt %; and
one or more co-dopants from 0.1 wt % to 10 wt % over 100 wt % of the glass base composition selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Specific Sampling of Glass System

Example 5

The following is a non-limiting, specific sampling of glass system example 5, that includes an alkali free fluorophosphate based glass formed from a composition, comprising of:
a metaphosphate, Ba(PO$_3$)$_2$, from 10 to 55 mol percent;
a metaphosphate, Al(PO$_3$)$_3$, from 5 to 20 mol percent;
fluorides;
where one or more fluorides are selected from a group consisting of:
barium fluoride BaF$_2$ 10 to 50 mol %;

antimony fluoride $SbF_3$ 0.5 to 10 mol %;
Zinc Fluoride $ZnF_2$ from 0.1 to 10 mol percent;
$SbF_3$ as dopant from 0.1 wt % to 10 wt % over 100% of base composition;
$CeF_3$ as co-dopant, from 0.1 to 10 wt % over 100% of base composition.

Glass System Example (6)

$\{\{Ba(PO_3)_2, Al(PO_3)_3, BaF_2, MgF_2, \text{ and } RF_x\}$ and $\{Sb \text{ Dopant}\}$ and or $\{Co\text{-Dopant}\}\}$ (6)

The above glass system example 6 is an alkali free fluorophosphate based glass formed from a composition, comprising of:
  a glass base composition, having:
    barium metaphosphate $Ba(PO_3)_2$, in mol percent;
    aluminum metaphosphate $Al(PO_3)_3$ in mol percent, and fluorides;
  where one or more fluorides are selected from a group consisting of:
    barium fluoride $BaF_2$ in mol percent;
    Magnesium Fluoride $MgF_2$ in mol %; and
    $RF_x$ in mol percent;
  where R is selected from a group consisting of: Ca, Sr, Pb, Y, Bi, Al, Zn, and combinations thereof, and subscript x is an index representing an amount of fluorine (F) in the compound $RF_x$; and
  one or more dopants in wt % over 100 wt % of the glass base composition;
  where the one or more dopants are selected from a group consisting of: $SbF_3$, $Sb_2O_3$, and combinations thereof; and
  one or more co-dopants in wt % over 100 wt % of the glass base composition selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

Non-Limiting Sampling of Glass System Example (6)

TABLE 6

| Glass Base Composition of Glass System Example (6) (mol %) | | | | | Dopants wt (%.) | co-dopants wt (%) |
|---|---|---|---|---|---|---|
| $Ba(PO_3)_2$ | $Al(PO_3)_3$ | $BaF_2$ | $MgF_2$ | $RF_x$ | Over 100% | Over 100% |
| 10 | 5 | 35 | 40 | 10 | .1 | 5 |
| 10 | 5 | 40 | 35 | 10 | .5 | 15 |
| 10 | 10 | 50 | 10 | 20 | .2 | 10 |
| 20 | 10 | 50 | 15 | 5 | .1 | 7 |
| 20 | 10 | 40 | 5 | 25 | .4 | 10 |
| 20 | 10 | 35 | 30 | 5 | 1 | 3 |

R is selected from a group consisting of: Ca, Sr, Pb, Y, Bi, Al, Zn, and combinations thereof;

Sub-script x is an index representing an appropriate amount of fluorine (F) in the compound $RF_x$ (e.g., $CaF_2$, $SrF_2$, $PbF_2$, $YF_3$, $BiF_3$, $AlF_3$, $ZnF_2$)

one or more dopant are over 100 weight (wt) % of the glass base composition of glass system example (6)

one or more dopants are selected from a group consisting of: $SbF_3$, $Sb_2O_3$, and combinations thereof one or more co-dopants are over 100 weight (wt) % of the base composition of glass system example (6)

one or more co-dopants are selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

Non-Limiting Particular Sampling of Glass System Example 6

The following is a non-limiting, specific sampling of glass system example 6, that includes an alkali free fluorophosphate based glass formed from a composition, comprising of:
  a metaphosphate, $Ba(PO_3)_2$, from 10 to 50 mol percent;
  a metaphosphate, $Al(PO_3)_3$, from 1 to 20 mol percent;
  fluorides;
  where one or more fluorides are selected from a group consisting of:
    barium fluoride $BaF_2$ from 20 to 20 mol percent
    Magnesium Fluoride $MgF_2$ from 1 to 20 mol percent, and
    $RF_x$ from 1 to 20 mol percent;
  where R is selected from a group consisting of: Ca, Sr, Pb, Y, Bi, Al, Zn, and combinations thereof, and subscript x is an index representing an amount of fluorine (F) in the compound $RF_x$; and
  a dopant $Sb_2O_3$ from 0.1 to 5 wt % over 100% of base composition; and
  one or more co-dopant, from 0.1 to 20 wt % over 100% of base composition, selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

Non-Limiting Specific Sampling of Glass System Example 6

The following is a non-limiting, specific sampling of glass system example 6, that includes an alkali free fluorophosphate based glass formed from a composition, comprising of:
  a metaphosphate, $Ba(PO_3)_2$, from 10 to 30 mol percent;
  a metaphosphate, $Al(PO_3)_3$, from 5 to 15 mol percent;
  fluorides;
  where one or more fluorides are selected from a group consisting of:
    barium fluoride $BaF_2$;
    Magnesium Fluoride $MgF_2$ from 10 to 50 mol percent
    $ZnF_2$ from 0.5 to 30 mol percent; and
  $Sb_2O_3$ as dopant, from 0.5 to 10 wt % over 100% of base composition; and CeF$_3$ as co-dopant, from 0.1 to 20 wt % over 100% of base composition.

Glass System Example (7)

{{Ba(PO$_3$)$_2$, Al(PO$_3$)$_3$, Sb$_2$O$_3$, BaF$_2$, MgF$_2$, and RF$_x$} and {Dopants} and or {Co-Dopants}} (7)

The above glass system example 7 is an alkali free fluorophosphate based glass formed from a composition, comprising of:
a glass base composition, having:
barium metaphosphate Ba(PO$_3$)$_2$, in mol percent;
aluminum metaphosphate Al(PO$_3$)$_3$ in mol percent,
antimony oxide Sb$_2$O$_3$ in mol percent; and
fluorides;
where one or more fluorides are selected from a group consisting of:
barium fluoride BaF$_2$ in mol percent;
Magnesium Fluoride MgF$_2$ in mol %; and
RFx in mol percent;
where R is selected from a group consisting of: Ca, Sr, Pb, Y, Bi, Al, Zn, and combinations thereof, and subscript x is an index representing an amount of fluorine (F) in the compound RF$_x$; and
one or more dopants/co-dopants in wt % over 100 wt % of the glass base composition;
where one or more dopants/co-dopants are selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Particular Sampling of Glass System Example 7

The following is a non-limiting, specific sampling of glass system example 7, that includes an alkali free fluorophosphate based glass formed from a composition, comprising of:
a metaphosphate, Ba(PO$_3$)$_2$, from 10 to 30 mol percent;
a metaphosphate, Al(PO$_3$)$_3$, from 5 to 20 mol percent;
antimony oxide Sb$_2$O$_3$ in mol percent; and
fluorides;
where one or more fluorides are selected from a group consisting of:
barium fluoride BaF$_2$ from 20 to 50 mol percent
Magnesium Fluoride MgF$_2$ from 10 to 40 mol percent, and
RFx from 1 to 30 mol percent;
where R is selected from a group consisting of: Ca, Sr, Pb, Y, Bi, Al, Zn, and combinations thereof, and subscript x is an index representing an amount of fluorine (F) in the compound RF$_x$; and
one or more dopants/co-dopants, from 0.1 to 20 wt % over 100% of base composition, selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Specific Sampling of Glass System Example 7

The following is a non-limiting, specific sampling of glass system example 7, that includes an alkali free fluorophosphate based glass formed from a composition, comprising of:

Non-Limiting Sampling of Glass System Example (7)

TABLE 7

| Glass Base Composition of Glass System (7) (mol %) | | | | | | Dopants wt (%) | co-dopants wt (%) |
| --- | --- | --- | --- | --- | --- | --- | --- |
| Ba(PO$_3$)$_2$ | Al(PO$_3$)$_3$ | Sb$_2$O$_3$ | BaF$_2$ | MgF$_2$ | RF$_x$ | Over 100% | Over 100% |
| 20 | 5 | 1 | 40 | 30 | 4 | .1 | 6 |
| 20 | 5 | 1 | 50 | 15 | 9 | .5 | 4 |
| 10 | 5 | 1 | 44 | 20 | 20 | 1 | 2 |
| 20 | 5 | 1 | 20 | 50 | 4 | .5 | 4 |
| 20 | 5 | 1 | 55 | 15 | 4 | 5 | 15 |
| 20 | 5 | 1 | 15 | 20 | 39 | 1 | 10 |

R is selected from a group consisting of: Ca, Sr, Pb, Y, Bi, Al, Zn, and combinations thereof;
Sub-script x is an index representing an appropriate amount of fluorine (F) in the compound RF$_x$ (e.g., CaF$_2$, SrF$_2$, PbF$_2$, YF$_3$, BiF$_3$, AlF$_3$, ZnF$_2$).
one or more dopant/co-dopant are over 100 weight (wt) % of the base composition of glass system example (7)
one or more dopants/co-dopants are selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$,
a metaphosphate, Ba(PO$_3$)$_2$, from 10 to 30 mol percent;
a metaphosphate, Al(PO$_3$)$_3$, from 5 to 25 mol percent;
antimony oxide Sb$_2$O$_3$ from 0.5 to 10 mol percent; and
fluorides;
where one or more fluorides are selected from a group consisting of:
barium fluoride BaF$_2$;
Magnesium Fluoride MgF$_2$ from 5 to 50 mol percent
Zinc Fluoride ZnF$_2$ from 0.1 to 20 mol percent;
CeF$_3$ as dopant, from 0.1 to 20 wt % over 100% of base composition.

Glass System Example (8)

{{Ba(PO$_3$)$_2$, Al(PO$_3$)$_3$, BaF$_2$, MgF$_2$, SbF$_3$, and RF$_x$} and {Dopants} and or {Co-Dopants}} (8)

The above glass system example 8 is an alkali free fluorophosphate based glass formed from a composition, comprising of:
  a glass base composition, having:
    barium metaphosphate Ba(PO$_3$)$_2$, in mol percent;
    aluminum metaphosphate Al(PO$_3$)$_3$ in mol percent- and fluorides;
    where one or more fluorides are selected from a group consisting of:
      barium fluoride BaF$_2$ in mol percen;
      Magnesium Fluoride MgF$_2$ in mol %;
      antimony fluoride SbF$_3$ in mol %; and
      RFx in mol percent;
      where R is selected from a group consisting of: Ca, Sr, Pb, Y, Bi, Al, Zn, and combinations thereof, and subscript x is an index representing an amount of fluorine (F) in the compound RF$_x$; and
  one or more dopants/co-dopants in wt % over 100 wt % of the glass base composition;
    where the one or more dopants/co-dopant are selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Sampling of Glass System Example (8)

TABLE 8

| Glass Base Composition of Glass System Example (8) (mol %) | | | | | | Dopants wt (%) | co-dopants wt (%) |
| --- | --- | --- | --- | --- | --- | --- | --- |
| Ba(PO$_3$)$_2$ | Al(PO$_3$)$_3$ | BaF$_2$ | MgF$_2$ | SbF$_3$ | RF$_x$ | Over 100% | Over 100% |
| 5 | 5 | 40 | 30 | 5 | 15 | 1 | 2 |
| 10 | 10 | 40 | 19 | 1 | 20 | .5 | 1 |
| 5 | 5 | 50 | 10 | 2 | 28 | 10 | .5 |
| 5 | 10 | 40 | 25 | 10 | 10 | 3 | 1 |
| 20 | 5 | 40 | 15 | .5 | 19.5 | 1.2 | .5 |
| 20 | 5 | 40 | 10 | 5 | 20 | 1 | .5 |

R is selected from a group consisting of: Ca, Sr, Pb, Y, Bi, Al, Zn, and combinations thereof;

Sub-script x is an index representing an appropriate amount of fluorine (F) in the compound RF$_x$ (e.g., CaF$_2$, SrF$_2$, PbF$_2$, YF$_3$, BiF$_3$, AlF$_3$, ZnF$_2$)

one or more dopant/co-dopant are over 100 weight (wt) % of the base composition of glass system example (8)

one or more dopants/co-dopants are selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Particular Sampling of Glass System Example 8

The following is a non-limiting, specific sampling of glass system example 8, that includes an alkali free fluorophosphate based glass formed from a composition, comprising of:
  a metaphosphate, Ba(PO$_3$)$_2$, from 10 to 30 mol percent;
  a metaphosphate, Al(PO$_3$)$_3$, from 5 to 15 mol percent; and
  fluorides;
  where one or more fluorides are selected from a group consisting of:
    barium fluoride BaF$_2$ from 10 to 50 mol percent
    Magnesium Fluoride MgF$_2$ from 5 to 40 mol percent,
    antimony fluoride SbF$_3$ from 0.1 to 10 mol percent; and
    RFx from 1 to 25 mol percent;
    where R is selected from a group consisting of: Ca, Sr, Pb, Y, Bi, Al, Zn, and combinations thereof, and subscript x is an index representing an amount of fluorine (F) in the compound RF$_x$; and
  one or more dopants/co-dopants, from 0.1 to 25 wt % over 100% of base composition, selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Specific Sampling of Glass System Example 8

The following is a non-limiting, specific sampling of glass system example 8, that includes an alkali free fluorophosphate based glass formed from a composition, comprising of:

a metaphosphate, Ba(PO$_3$)$_2$, from 10 to 30 mol percent;
  a metaphosphate, Al(PO$_3$)$_3$, from 5 to 20 mol percent; and
  fluorides;
  where one or more fluorides are selected from a group consisting of:

barium fluoride BaF$_2$;
  Magnesium Fluoride MgF$_2$ from 10 to 50 mol percent;
  antimony fluoride SbF$_3$ from 0.1 to 10 mol percent; and
  Zinc Fluoride ZnF$_2$ from 0.1 to 20 mol percent;
  CeF$_3$ as dopant, from 0.1 to 20 wt % over 100% of base composition.

Glass System Example (9)

{{Ba(PO$_3$)$_2$, Al(PO$_3$)$_3$, Sb$_2$O$_3$, BaF$_2$, MgF$_2$, and RF$_x$} and {Sb$_2$O$_3$ Dopant} and or {Co-Dopant}}
(9)

The above glass system example 9 is an alkali free fluorophosphate based glass formed from a composition, comprising of:
- a glass base composition, having:
- barium metaphosphate Ba(PO$_3$)$_2$, in mol percent;
- aluminum metaphosphate Al(PO$_3$)$_3$ in mol percent;
- antimony oxide Sb$_2$O$_3$ in mol percent; and
- fluorides;
- where one or more fluorides are selected from a group consisting of:
- barium fluoride BaF$_2$ in mol percent;
- Magnesium Fluoride MgF$_2$ in mol %; and
- RFx in mol percent;
- where R is selected from a group consisting of: Ca, Sr, Pb, Y, Bi, Al, Zn, and combinations thereof, and subscript x is an index representing an amount of fluorine (F) in the compound RF$_x$; and
- one or more dopants in wt % over 100 wt % of the glass base composition;
- where the dopants is Sb$_2$O$_3$
- one or more co-dopants in wt % over 100 wt % of the glass base composition;
- where the one or more co-dopants are selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Sampling of Glass System Example (9)

TABLE 9

| Glass Base Composition of Glass System Example (9) (mol %) | | | | | | Dopants wt (%) Over 100% | co-dopants wt (%) |
|---|---|---|---|---|---|---|---|
| Ba(PO$_3$)$_2$ | Al(PO$_3$)$_3$ | Sb$_2$O$_3$ | BaF$_2$ | MgF$_2$ | RF$_x$ | (Sb$_2$O$_3$) | Over 100% |
| 10 | 5 | 1 | 49 | 30 | 5 | .1 | 5 |
| 10 | 5 | 2 | 50 | 30 | 3 | .1 | 1.5 |
| 20 | 10 | .5 | 30 | 35 | 4.5 | 1 | 10 |
| 20 | 10 | 1 | 35 | 30 | 4 | .5 | 1.5 |
| 40 | 10 | .5 | 29 | 20 | .5 | .5 | 2 |
| 40 | 10 | 1 | 30 | 28 | 1 | .2 | 1.2 |

R is selected from a group consisting of: Ca, Sr, Pb, Y, Bi, Al, Zn, and combinations thereof;
Sub-script x is an index representing an appropriate amount of fluorine (F) in the compound RF$_x$ (e.g., CaF$_2$, SrF$_2$, PbF$_2$, YF$_3$, BiF$_3$, AlF$_3$, ZnF$_2$)
one or more dopants in wt % over 100 wt % of the glass base composition;
where the dopant is selected from: Sb$_2$O$_3$
one or more co-dopants in wt % over 100 wt % of the glass base composition;
where the one or more co-dopants are selected from a group consisting of: CeO$_2$, CeF$_3$, Er$_2$O$_3$, ErF$_3$, Nd$_2$O$_3$, NdF$_3$, Yb$_2$O, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Particular Sampling of Glass System Example 9

The following is a non-limiting, specific sampling of glass system example 9, that includes an alkali free fluorophosphate based glass formed from a composition, comprising of:
- a metaphosphate, Ba(PO$_3$)$_2$, from 2 to 40 mol percent;
- a metaphosphate, Al(PO$_3$)$_3$, from 5 to 20 mol percent;
- antimony oxide Sb$_2$O$_3$ from 1 to 5 mol percent;
- fluorides;
- where one or more fluorides are selected from a group consisting of:
- barium fluoride BaF$_2$ from 10 to 50 mol percent
- Magnesium Fluoride MgF$_2$ from 10 to 50 mol percent, and
- RFx from 10 to 50 mol percent;
- where R is selected from a group consisting of: Ca, Sr, Pb, Y, Bi, Al, Zn, and combinations thereof, and subscript x is an index representing an amount of fluorine (F) in the compound RF$_x$; and
- one or more dopants are from 0.1 wt % to 20 wt % over 100 wt % of the glass base composition;
- where the dopant is Sb$_2$O$_3$
- one or more co-dopants are from 0.1 wt % to 20 wt % over 100 wt % of the glass base composition;
- where the one or more co-dopants are selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

Non-Limiting Specific Sampling of Glass System Example 9

The following is a non-limiting, specific sampling of glass system example 9, that includes an alkali free fluorophosphate based glass formed from a composition, comprising of:
- a metaphosphate, Ba(PO$_3$)$_2$, from 10 to 20 mol percent;
- a metaphosphate, Al(PO$_3$)$_3$, from 5 to 10 mol percent;
- antimony oxide Sb$_2$O$_3$ from 0.5 to 5 mol percent;
- fluorides;
- where one or more fluorides are selected from a group consisting of:

barium fluoride $BaF_2$ from 10 to 50 mol percent
Zinc Fluoride $ZnF_2$ from 0.1 to 20 mol percent;
$CeF_3$ as dopant, from 0.1 to 20 wt % over 100% of base composition.

Glass System Example (10)

$$\{\{Ba(PO_3)_2, Al(PO_3)_3, BaF_2, MgF_2, SbF_3, \text{ and } RF_x\} \text{ and } \{SbF_3 \text{ Dopent}\} \text{ and or } \{Co\text{-}Dopant\}\} \quad (10)$$

The above glass system example 10 is an alkali free fluorophosphate based glass formed from a composition, comprising of:
a glass base composition, having:
  barium metaphosphate $Ba(PO_3)_2$, in mol percent;
  aluminum metaphosphate $Al(PO_3)_3$ in mol percent;
  antimony oxide $SbF_3$ in mol percent; and
  fluorides;
where one or more fluorides are selected from a group consisting of:
  barium fluoride $BaF_2$ in mol percent;
  Magnesium Fluoride $MgF_2$ in mol %;
  antimony Fluoride $SbF_3$ in mol %; and
  RFx in mol percent;
where R is selected from a group consisting of: Ca, Sr, Pb, Y, Bi, Al, Zn, and combinations thereof, and subscript x is an index representing an amount of fluorine (F) in the compound $RF_x$; and
one or more dopants in wt % over 100 wt % of the glass base composition;
  where the dopants is $SbF_3$
one or more co-dopants in wt % over 100 wt % of the glass base composition;
where the one or more co-dopants are selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

Non-Limiting Sampling of Glass System Example (10)

TABLE 10

| Glass Base Composition of Glass System example (10) (mol %) | | | | | | Dopants wt (%) Over 100% | co-dopants wt (%) |
|---|---|---|---|---|---|---|---|
| $Ba(PO_3)_2$ | $Al(PO_3)_3$ | $BaF_2$ | $MgF_2$ | $SbF_3$ | $RF_x$ | $(SbF_3)$ | Over 100% |
| 5 | 5 | 40 | 40 | 1 | 9 | .1 | .5 |
| 20 | 5 | 55 | 15 | 1 | 4 | .1 | 1 |
| 10 | 5 | 50 | 5 | 1 | 29 | .1 | 1.5 |
| 10 | 5 | 50 | 10 | 1 | 24 | .1 | 1.2 |
| 20 | 5 | 40 | 5 | 1 | 29 | .1 | 5 |
| 20 | 5 | 40 | 20 | 1 | 14 | .1 | 10 |

R is selected from a group consisting of: Ca, Sr, Pb, Y, Bi, Al, Zn, and combinations thereof;
Sub-script x is an index representing an appropriate amount of fluorine (F) in the compound $RF_x$ (e.g., $CaF_2$, $SrF_2$, $PbF_2$, $YF_3$, $BiF_3$, $AlF_3$, $ZnF_2$)
one or more dopants in wt % over 100 wt % of the glass base composition;
  where the dopant is $SbF_3$
one or more co-dopants in wt % over 100 wt % of the glass base composition;
where the one or more co-dopants are selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

Non-Limiting Particular Sampling of Glass System Example 10

The following is a non-limiting, specific sampling of glass system example 10, that includes an alkali free fluorophosphate based glass formed from a composition, comprising of:
  a metaphosphate, $Ba(PO_3)_2$, from 5 to 20 mol percent;
  a metaphosphate, $Al(PO_3)_3$, from 5 to 20 mol percent;
  fluorides;
where one or more fluorides are selected from a group consisting of:
  barium fluoride $BaF_2$ from 10 to 50 mol percent
  Magnesium Fluoride $MgF_2$ from 10 to 50 mol percent,
  Antimony Fluoride $SbF_3$ from 0.1 to 10 mol percent; and
  RFx from 1 to 25 mol percent;
where R is selected from a group consisting of: Ca, Sr, Pb, Y, Bi, Al, Zn, and combinations thereof, and subscript x is an index representing an amount of fluorine (F) in the compound $RF_x$; and
one or more dopants are from 0.1 wt % to 20 wt % over 100 wt % of the glass base composition;
  where the dopant is $SbF_3$
one or more co-dopants are from 0.1 wt % to 25 wt % over 100 wt % of the glass base composition;
where the one or more co-dopants are selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$ $MnO_2$, $MnF_4$, $Co_2O_3$, $CoF_3$, $Ni_2O_3$, $NiF_3$, and combinations thereof.

Non-Limiting Specific Sampling of Glass System Example 10

The following is a non-limiting, specific sampling of glass system example 10, that includes an alkali free fluorophosphate based glass formed from a composition, comprising of:

a metaphosphate, $Ba(PO_3)_2$, from 10 to 40 mol percent;
a metaphosphate, $Al(PO_3)_3$, from 5 to 25 mol percent;
fluorides;
where one or more fluorides are selected from a group consisting of:
barium fluoride $BaF_2$ from 10 to 50 mol percent;
Antimony Fluoride $SbF_3$ from 0.1 to 10 mol percent; and
Zinc Fluoride $ZnF_2$ from 0.1 to 25 mol percent;
$CeF_3$ as dopant, from 0.1 to 20 wt % over 100% of base composition.

Alkali free fluorophosphate-based glass systems of the present invention are highly radiation resistant (they do not solarize before, during, and after application of high energy $10^5$ Rads of radiation (or 1 kGy) or higher), and shields against high radiation energy, and hence, are reusable.

In particular, alkali free fluorophosphate-based glass systems of the present invention are radiation resistance and provide a mechanism for determining existence of radiation via scintillations of Ce compounds, and are 90% plus transparent in ultra-violet spectrum of $10^5$ Rads of radiation (or 1 kGy) or higher.

Improvement of transmittance from 65% to 90% transmittance is due mainly to the addition of Sb (with Ce as dopant and or co-dopant). It should be noted that since Sb does not scintillate, it aids in increasing the radiation resistance of the alkali free fluorophosphate-based glass systems of the present invention but without scintillations that may interfere with scintillations of Ce.

Radiation resistant and radiation shielding characteristics of the glass systems of the present invention provide high resistance and shield against high levels of energy without solarizing (e.g., browning or darkening of the optical component–no solarization) before, during, and after irradiation of $10^5$ Rads of radiation (or 1 kGy) or higher.

The combination of unique molecular structure, such as large atomic radius, high electro-negativity of fluorine (about 4 eV), and the reverse change of valency of Ce (IV), Sb(V) enable the glass systems to achieve higher solarization resistance and allow for detection of radiation within the ultra-violet spectrum due to scintillations of Ce when the glass systems are irradiated (exposed to high energy radiations of $10^5$ Rads of radiation (or 1 kGy) or higher).

The incorporation of metaphosphate compounds such as $Ba(PO_3)_2$ and fluorides such as $BaF_2$ creates a glass with large atomic radius (2.53 Å for Ba), which allows the dopant to move and function within the glass matrix more freely thus creating a more efficient optical media. Additionally, the unique structure of glass allows for the dopant to be uniformly dispersed, reducing temperature gradients and distortions.

During high energy radiation exposure (e.g., the gamma ray or neutron fluxes and fluencies), the Ce and Sb create a continuing de-solarization process that enable the glass systems of the present invention to remain de-solarized before, during, and after radiations due to Ce and Sb having a remarkably high transformation of valency (for example, of approximately 90-95% for Ce and Sb, each). That is, when the Ce and Sb are bombarded by the gamma, neutron or other high energy (radiation and/or particle), the transformation of the valency of Ce and Sb from Ce(IV) to Ce(III) and vice versa (or Sb(V) to Sb(III) and vice versa) constantly reoccurs, which allows the glass matrix to remain de-solarized while scintillating within the ultraviolet spectrum of the EM spectra in accordance with the following:

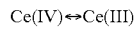

and

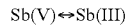

The glass systems of the present invention have a density of 4 g/cm³ with high radiation resistance (before, during, and after radiation) of neutron fluxes ranging from about $3 \times 10^9$ n/cm²-sec to $1 \times 10^{15}$ n/cm²-sec with fluences ranging from about $2 \times 10^{17}$ n/cm² to $8.3 \times 10^{22}$ n/cm².

In particular, no gamma ray responses were detected in neutron detectors when using the glass systems of present invention. In fact, neutrons detected were those that are not in thermal equilibrium with their surroundings. That is, the neutrons detected were not thermal neutrons. Accordingly, both gamma rays and thermal neutrons were not detected by neutron detectors when using the glass systems of the present invention, enabling detection of non-thermal neutrons with no gamma response. For example, one or more embodiments of the glass systems of present invention exhibited the following results during neutron detection:

No Gamma Response
Source: Cs-137
High voltage=650 KeV
Gain=15 x
Pre-amp=0
Shaping time=4 us
Counting time=500 s
Integrated Total Count=109 counts
(count rate=0.2 cps)

It should be noted that it is the addition of $SbF_3$ that provides the added advantage in addition to improved radiation resistance, that when used in neutron detector, it is Sb compounds that isolates (e.g., by filtering (may be by absorption)) the gamma waves from the neutron particles and hence, only neutrons are detected by neutron detector. That is, there is no gamma response during neutron detection when using Sb. This is accomplished without the addition of LiF or other modifications to the glass system. This eliminates false readings by neutron detectors since no gamma immersion is detected during detection of neutrons. Accordingly, one or more embodiments of the glass systems of the present invention enable detection of neutrons only, with no detection of gamma response.

Additionally, the addition of Sb also eliminates unwanted afterglow during scintillation processes. The combination of $CeF_3$ and $SbF_3$ rather than their oxides eliminates the scintillation afterglow. The addition of F with its electronegativity of $\chi=4$ eV electronegativity increases the overall electronegativity of the glass structure, which increases the number and occurrence of Ce and Sb transformations within the glass structure. It is well known that F has a greater electronegativity than O. Accordingly, due to its higher electronegativity, use of $CeF_3$ and $SbF_3$ remove afterglow in addition to reducing the overall decay time $\tau$ to 5 to 10 ns and increasing radiation resistance to maintain transparency under $10^5$ Rad of radiation (or 1 kGy) or higher within ultraviolet spectrum.

The following table 11 illustrates the light output of one or more embodiments of the glass systems compared to Lead Tungsten (PWO) when excited by application of high energy:

TABLE 11

| (TRANSPARENCY) EWLT (%) | LIGHT OUTPUT (LO) LO (p.e./MeV) | LO/LO (LEAD-TUNGSTON- PWO) (%) |
|---|---|---|
| 80.1 | 12.0 | 136 |
| 81.1 | 11.7 | 133 |

TABLE 11-continued

| (TRANSPARENCY) EWLT (%) | LIGHT OUTPUT (LO) LO (p.e./MeV) | LO/LO (LEAD- TUNGSTON- PWO) (%) |
|---|---|---|
| 79.6 | 11.6 | 132 |
| 81.3 | 11.7 | 133 |

It should be noted that addition of Zn as part of the glass base composition of the one or more embodiments of the alkali free fluorophosphate-based glass systems of the present invention shortens scintillation decay time z of from about 20 ns to 40 ns to about 5 ns to 10 ns within the ultra-violet spectrum under $10^5$ Rads of radiation (or 1 kGy) or higher.

$ZnF_2$ reduces the overall covalency of the alkali free fluorophosphate-based glass system and hence, improves transformation of Ce during high energy radiations, which, in turn, shortens the Ce scintillations decay time. Due to larger atomic size of Zn, the overall spatial structure of the alkali free fluorophosphate-based glass system increases, which facilitates or aids in transformation of Ce. This speeds up the decay time (from 20 to 40 ns down to about 5 to 10 ns) and hence, improves scintillations.

A non-limiting method of making he glass systems of present invention may be accomplished in batches. The glass systems may be batched with pure chemicals that are about 99.999% pure. The batch may be mixed to achieve homogeneity. The batch may be melted in to one or more embodiments of the glass systems in graphite or vitreous carbon crucibles in inert atmosphere for about 4-6 hours at temperatures ranging 700-1200 degrees Celsius.

The resulting melted glass systems may be annealed for about 48-72 hours, and may be cut and polished in to different sizes and shapes such as a cube (for examples, cubes ranging from 10 mm to 100 mm). If the glass systems are to be used for neutron detection, the glass systems may optionally further be coated with LiF that contains $^6$Li isotope and combined together in to detector panels. The detector panels may be installed in a neutron detector that includes electronics that allow for the data interpretation and or conversion of the detected neutron signals in to data or in to an image. Neutron detector devices are well known.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, one or more embodiments of the present invention provide alkali free fluorophosphate-based glass systems that include glass compositions that are useful in numerous applications, a few, non-limiting, non-exhaustive listing of examples of which may include applications in lasers, amplifiers, windows, sensors (e.g., scintillators), fibers, fiber lasers, high density optical storage applications, radiation resistance, radiation shielding, radiation detection, fluorine resistance applications, and many more. Others may include high energy physics, particle detectors such as neutron detectors, etc. Such variations and alternate embodiments and use are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, lateral, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group. Further the terms "a" and "an" throughout the disclosure (and in particular, claims) do not denote a limitation of quantity, but rather denote the presence of at least one of the referenced item. The use of the phrases "and or," "and/or" or the use of the symbol "/" throughout the specification are equivalent and indicate an inclusive "or" where for example, A and or B should be interpreted as "A," "B," or both "A and B."

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. An alkali free fluorophosphate based glass system, comprising of:
  a glass base composition, having:
  barium metaphosphate $Ba(PO_3)_2$, in mol percent;
  aluminum metaphosphate $Al(PO_3)_3$ in mol percent, and one or more fluorides;
  where the one or more fluorides are selected from a group consisting of:
  barium fluoride $BaF_2$ and $RFx$ in mol percent;
  where R is selected from a group consisting of: Mg, Ca, Sr, Pb, Y, Bi, Al, Zn, and combinations thereof, and subscript x is an index representing an amount of fluorine (F) in the compound $RF_x$;
  one or more dopant in wt % over 100 wt % of the glass base composition;
  where the one or more dopant is selected from a group consisting of: $SbF_3$, $Sb_2O_3$, or combinations thereof; and
  one or more co-dopants in wt % over 100 wt % of the glass base composition selected from a group consisting of: $CeO_2$, $CeF_3$, $Er_2O_3$, $ErF_3$, $Nd_2O_3$, $NdF_3$, $Yb_2O_3$, $YbF_3$, $Pr_2O_3$, $PrF_3$, $Eu_2O_3$, $EuF_3$, $Tb_2O_3$, $TbF_3$, ZnO, $ZnF_2$, $Ho_2O_3$, $HoF_3$, $Sm_2O_3$, $SmF_3$, $Tm_2O_3$, $TmF_3$, $Lu_2O_3$, $LuF_3$, $Gd_2O_3$, $GdF_3$, $Dy_2O_3$, $DyF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and combinations thereof.

2. An alkali free fluorophosphate based glass system, comprising of:
    a glass base composition, having:
    barium metaphosphate Ba(PO$_3$)$_2$, in mol percent,
    aluminum metaphosphate Al(PO$_3$)$_3$ in mol percent, and
    one or more antimony (Sb),
    where the one or more antimony is selected from a group consisting of: Sb$_2$O$_3$, SbF$_3$ in mol percent; and
    one or more fluorides;
    where the one or more fluorides are selected from a group consisting of:
    barium fluoride BaF$_2$ and RFx in mol percent;
    where R is selected from a group consisting of: Mg, Ca, Sr, Pb, Y, Bi, Al, Zn, and combinations thereof, and subscript x is an index representing an amount of fluorine (F) in the compound RF$_x$; and
    one or more dopants in wt % over 100 wt % of the glass base composition selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

3. An alkali free fluorophosphate based glass system, comprising of:
    a glass base composition, having:
    barium metaphosphate Ba(PO$_3$)$_2$, in mol percent;
    aluminum metaphosphate Al(PO$_3$)$_3$ in mol percent, and
    one or more fluorides;
    where the one or more fluorides are selected from a group consisting of:
    barium fluoride BaF$_2$ in mol percent;
    Magnesium Fluoride MgF$_2$ in mol %; and
    RFx in mol percent;
    where R is selected from a group consisting of: Ca, Sr, Pb, Y, Bi, Al, Zn, and combinations thereof, and subscript x is an index representing an amount of fluorine (F) in the compound RF$_x$; and
    one or more dopants in wt % over 100 wt % of the glass base composition;
    where the one or more dopants are selected from a group consisting of: SbF$_3$, Sb$_2$O$_3$, and combinations thereof; and
    one or more co-dopants in wt % over 100 wt % of the glass base composition selected from a group consisting of: CeO$_2$, CeF$_3$, Er$_2$O$_3$, ErF$_3$, Nd$_2$O$_3$, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

4. An alkali free fluorophosphate based glass system, comprising of:
    a glass base composition, having:
    barium metaphosphate Ba(PO$_3$)$_2$, in mol percent;
    aluminum metaphosphate Al(PO$_3$)$_3$ in mol percent,
    one or more antimony (Sb),
    where the one or more antimony is selected from a group consisting of: Sb$_2$O$_3$, SbF$_3$, and combinations thereof in mol percent; and
    and
    one or more fluorides;
    where the one or more fluorides are selected from a group consisting of:
    barium fluoride BaF$_2$ in mol percent;
    Magnesium Fluoride MgF$_2$ in mol %; and
    RFx in mol percent;
    where R is selected from a group consisting of: Ca, Sr, Pb, Y, Bi, Al, Zn, and combinations thereof, and subscript x is an index representing an amount of fluorine (F) in the compound RF$_x$; and
    one or more dopants in wt % over 100 wt % of the glass base composition;
    where the one or more dopants are selected from a group consisting of: CeO$_2$, CeF$_3$, Er$_2$O$_3$, ErF$_3$, Nd$_2$O, NdF$_3$, Yb$_2$O$_3$, YbF$_3$, Pr$_2$O$_3$, PrF$_3$, Eu$_2$O$_3$, EuF$_3$, Tb$_2$O$_3$, TbF$_3$, ZnO, ZnF$_2$, Ho$_2$O$_3$, HoF$_3$, Sm$_2$O$_3$, SmF$_3$, Tm$_2$O$_3$, TmF$_3$, Lu$_2$O$_3$, LuF$_3$, Gd$_2$O$_3$, GdF$_3$, Dy$_2$O$_3$, DyF$_3$, CuO, CuF$_2$, TiO$_2$, TiF$_4$, Cr$_2$O$_3$, CrF$_3$, Mo$_2$O$_3$, MoF$_3$, W$_2$O$_3$, WF$_3$, MnO$_2$, MnF$_4$, Co$_2$O$_3$, CoF$_3$, Ni$_2$O$_3$, NiF$_3$, and combinations thereof.

* * * * *